United States Patent
Zhao et al.

(10) Patent No.: US 11,093,258 B2
(45) Date of Patent: Aug. 17, 2021

(54) METHOD FOR TRUSTED BOOTING OF PLC BASED ON MEASUREMENT MECHANISM

(71) Applicant: SHENYANG INSTITUTE OF AUTOMATION, CHINESE ACADEMY OF SCIENCES, Liaoning (CN)

(72) Inventors: Jianming Zhao, Liaoning (CN); Xianda Liu, Liaoning (CN); Tianyu Wang, Liaoning (CN); Bowen Zhang, Liaoning (CN); Chunyu Chen, Liaoning (CN); Peng Zeng, Liaoning (CN); Haibin Yu, Liaoning (CN)

(73) Assignee: SHENYANG INSTITUTE OF AUTOMATION, CHINESE ACADEMY OF SCIENCES, Shenyang (CN)

( * ) Notice: Subject to any disclaimer, the term of this patent is extended or adjusted under 35 U.S.C. 154(b) by 456 days.

(21) Appl. No.: 15/572,624

(22) PCT Filed: Mar. 14, 2017

(86) PCT No.: PCT/CN2017/076532
§ 371 (c)(1),
(2) Date: Nov. 8, 2017

(87) PCT Pub. No.: WO2018/107595
PCT Pub. Date: Jun. 21, 2018

(65) Prior Publication Data
US 2018/0285127 A1    Oct. 4, 2018

(30) Foreign Application Priority Data
Dec. 15, 2016 (CN) .......................... 201611162151.2

(51) Int. Cl.
G06F 9/4401 (2018.01)
G06F 8/61 (2018.01)
(Continued)

(52) U.S. Cl.
CPC ....... G06F 9/4416 (2013.01); G05B 19/0426 (2013.01); G06F 8/61 (2013.01);
(Continued)

(58) Field of Classification Search
None
See application file for complete search history.

(56) References Cited

U.S. PATENT DOCUMENTS 5,606,660 A * 2/1997 Estakhri .............. G06F 11/1004
714/38.1
9,652,570 B1 * 5/2017 Kathail ................. G06F 17/505
(Continued)

FOREIGN PATENT DOCUMENTS

| CN | 103559591 A | 2/2014 |
|---|---|---|
| CN | 103645672 A | 3/2014 |
| CN | 104318142 A | 1/2015 |

OTHER PUBLICATIONS

China Measurement & Test, "Embedded system firmware security verification method based on Hash algorithm" G. Liu, Z. Yu, X. Hong, W. Tan, vol. 40 No. 5 Sep. 2014 (in CN with English Abstract).
(Continued)

*Primary Examiner* — Paul Yen
(74) *Attorney, Agent, or Firm* — Smith, Gambrell & Russell, LLP (57) ABSTRACT

The present invention discloses a method for trusted booting of PLC based on a measurement mechanism, comprising the following steps: a step of initializing self firmware verification; a step of reading and computing firmware informa-
(Continued)

tion about a PLC; a step of checking and storing one by one; and a step of verifying at the operation start stage. In the method of the present invention, a chip with a trusted function is used as a core of hardware computation. The PLC extends a Flash bus for loading by hardware of the method of the present invention. The hardware of the method of the present invention recognizes necessary boot information, verifies the integrity of the boot loader necessary for the PLC system through the integrity check method and ensures that the booted PLC system is in a trusted state. On the basis of ensuring validity and feasibility for the safety of a terminal device, the present invention can build a safe and trusted industrial control system operating environment.

9 Claims, 4 Drawing Sheets (51) Int. Cl.
G05B 19/042 (2006.01)
G06F 9/445 (2018.01)
G06F 21/57 (2013.01)
G05B 19/05 (2006.01)

(52) U.S. Cl.
CPC ........ *G06F 9/4401* (2013.01); *G06F 9/44589* (2013.01); *G06F 21/575* (2013.01); *G05B 19/05* (2013.01)

(56) References Cited

U.S. PATENT DOCUMENTS

| 9,940,069 | B1* | 4/2018 | Auchmoody | G06F 3/0655 |
| 2006/0107320 | A1* | 5/2006 | Bhatt | G06F 21/575 726/22 |
| 2006/0174109 | A1* | 8/2006 | Flynn | G06F 9/4406 713/164 |
| 2008/0092210 | A1* | 4/2008 | Tobita | G06F 21/572 726/2 |
| 2010/0011200 | A1* | 1/2010 | Rosenan | G06F 21/575 713/2 |
| 2016/0283721 | A1 | 9/2016 | Nemiroff et al. | |

OTHER PUBLICATIONS

International Search Report dated Jun. 29, 2017 for International Patent Application No. PCT/CN2017/076532 (3 pages in Chinese with English translation).
Zhang Xianghong & Geng Guining. Research on Industrial Control Security Architecture Based on Trusted Computing. Confidential Science and Technology, Expert Opinion. Aug. 2014. (12 pages—Chinese with English abstract).
Qiao Quansheng, Xing Shuangyun, Shang Wenli, Zhao Jianming, Zhao Xuefeng. Design and Implementation of the Trusted PLC. Process Automation Instrumentation. Dec. 2016. vol. 37, No. 12. (4 pages—Chinese with English abstract).
Search Report for Chinese Patent Application No. 201611162151.2 dated Mar. 19, 2019 (1 page).
First Office Action for Chinese Patent Application No. 201611162151.2 dated Apr. 1, 2019 (5 pages), with English Translation (9 pages).
Second Office Action for Chinese Patent Application No. 201611162151.2 dated Sep. 30, 2019 (5 pages), with English Translation (9 pages).
Notification to Grant Patent Rights for Invention for Chinese Patent Application No. 201611162151.2 dated Feb. 3, 2020 (1 page), with English Translation (2 pages).
Written Opinion of the International Searching Authority for International Patent Application No. PCT/CN2017/076532 dated Jun. 29, 2017 (3 pages), with English Translation (4 pages).
International Preliminary Report on Patentability for International Patent Application No. PCT/CN2017/076532 dated Jun. 18, 2019 (4 pages), with English Translation (5 pages).
Lee, Bin-bin. Integrity of the PLC Firmware Enhancement Method Based on MD5. Full-Text Database of Excellent Master's Degree Thesis in China. Information Technology Series, No. 5, 2014, May 31, 2014 (63 pages), with machine translation (55 pages).

* cited by examiner

```
#define CONFIG_EXTRA_ENV_SETTINGS                    \
        "ethaddr=00:0a:35:00:01:22\0"                \
        "kernel_image=uImage\0"                      \
        "kernel_load_address=0x2080000\0"            \
        "ramdisk_image=uramdisk.image.gz\0"          \
        "ramdisk_load_address=0x4000000\0"           \
        "devicetree_image=devicetree.dtb\0"          \
        "devicetree_load_address=0x2000000\0"        \
        "bitstream_image=system.bit.bin\0"           \
        "boot_image=BOOT.bin\0"                      \
        "loadbit_addr=0x100000\0"                    \
        "loadbooteny_addr=0x2000000\0"               \
        "kernel_size=0x500000\0"                     \
        "devicetree_size=0x20000\0"                  \
        "ramdisk_size=0x5E0000\0"                    \
        "boot_size=0xF00000\0"                       \
        "fdt_high=0x20000000\0"                      \
        "initrd_high=0x20000000\0"                   \
        "booteny=uEnv.txt\0"                         \
```

METHOD FOR TRUSTED BOOTING OF PLC BASED ON MEASUREMENT MECHANISM

FIELD OF THE INVENTION

The present invention relates to the technical field of application of programmable logic controllers for computers, in particular to a method for trusted booting of PLC based on a measurement mechanism.

BACKGROUND OF THE INVENTION

Industrial control systems (ICS) are jointly composed of various automatic control components and process control components for real-time data collection and monitoring. The components include a supervisory control and data acquisition (SCADA) system, a distributed control system (DCS), a programmable logic controller (PLC), a remote terminal unit (RTU), an intelligent electronic device (IED) and interface technologies for ensuring communication of all the components.

Up to Sep. 10, 2015, the number of vulnerabilities related to the industrial control systems publicly issued by three organizations including China National Vulnerability Database of Information Security (CNNVD), Common Vulnerabilities & Exposures (CVE) and The Industrial Control Systems Cyber Emergency Response Team (ICS-CERT) is 568, relating to 120 relevant manufacturers in China and abroad.

At present, a large number of standard information network technologies or products are used in devices including a site control device, process control automation software, an engineer station, an operator station, an OPC interface machine and the like used in the industrial control systems. These technologies and products are not optimized and specially designed for an application environment of the industrial control systems, causing the industrial control systems to introduce a large number of "redundant functions and configurations". Designers, implementers and engineers of the industrial control systems are not aware of security problems caused by these "redundant functions and configurations", and still achieve control functions in accordance with old ideas. Some industrial control system manufacturers and control system developers notice information security. However, because of lack of relevant knowledge and skills, security functions designed and achieved by control systems not only fail to make full use of basic security technologies and functions provided by information systems, but also have some errors and defects in design (for example, incorrect key management, password protection measures and the like).

Network boundary protection measures are weak. In most of enterprises, because types of the industrial control systems are diversified and security management consciousness and responsibilities are indefinite, on one hand, clear security policies are not implemented for data transmission between networks and authorization management, and on the other hand, enterprise management levels are connected to the Internet, so that Internet users may use the vulnerabilities of enterprise management network systems to directly acquire operation control data of key devices of a production control network in a "tunnel" mode, thereby causing a major potential safety hazard to the operation of the industrial control systems.

A computer of the industrial control systems has a major feature of relative fixation. Each engineer station, operator station and OPC interface computer largely use WINDOWS systems, and these systems cannot upgrade patches throughout the year and have no corresponding virus protection measure. Once management of removable media is neglected, infection events of viruses, etc. may frequently occur. Some enterprises use remote maintenance or diagnosis or use external mobile terminals in overhaul or troubleshooting of the industrial control systems, but do not take strict security measures, possibly causing unauthorized access to the systems. Meanwhile, security problems (such as viruses, Trojan and other malicious programs) of the mobile terminals may also infect the overall system. For the industrial control systems which open remote diagnosis and maintenance due to the use of foreign brands, the security problems are especially obvious.

Under the background of intelligent manufacture and industrial 4.0 strategy, digitization and informatization for industrial production become an inevitable trend for future development, and industrial automation with high degree of integration of IT technologies is also widely applied. Through a Woo-yun platform, ICS-CERT and a national information security vulnerability sharing platform, it can be seen that an increasing number of security vulnerabilities of the industrial control systems (PLC, DCS and SCADA) and even application software are issued, including various security vulnerabilities of products of well-known industrial control system manufacturers such as ABB, Schneider Electric, Siemens, Rockwell Automation and the like.

The security problems of the terminals of the industrial control systems are produced because an existing platform architecture is open and the malicious programs are very easy to be implanted into a software system. Moreover, all methods that attempt to detect malicious codes through the software cannot prove the security of detection software. It is expressed that the malicious codes hidden in a firmware chip of a terminal device are remotely controlled by an attacker to attack the industrial control systems, such as information stealing, data deletion, system destruction, etc.

At present, the security study aspect of the terminals of the industrial control systems mainly focuses on the following three aspects:

(1) traditional PIN-based identity authentication and biological feature-based identity authentication, to solve the problems of sensitive information leakage of users, unprotected interfaces, etc. possibly caused by the lack of a domain isolation mechanism in a mobile platform;

(2) with respect to the problems that whether a double-factor authentication solving platform based on password and fingerprints is safe and trusted, and the users cannot authenticate the terminals and lack of a user privacy protection mechanism, etc;

(3) a trusted mobile platform architecture based on a mobile trusted module (MTM), to research a problem for establishing a trust relationship between the users and service providers in different identifier domains.

In general, a trusted security research on the terminals of the industrial control systems already obtains some phase achievements, but a trusted boot research on embedded devices is still in an initial phase.

SUMMARY OF THE INVENTION

A technical problem to be solved by the present invention is to provide a method for trusted booting of PLC based on a measurement mechanism. In the method of the present invention, a chip with a trusted function is used as a core of hardware computation. The PLC extends a Flash bus for loading by hardware of the method of the present invention.

The hardware of the method of the present invention recognizes necessary boot information, verifies the integrity of the boot loader necessary for the PLC system through the integrity check method and ensures that the booted PLC system is in a trusted state. On the basis of ensuring validity and feasibility for the safety of a terminal device, the present invention can build a safe and trusted industrial control system operating environment.

To solve the above technical problem, the present invention provides a method for trusted booting of PLC based on a measurement mechanism, comprising the following steps: at a factory initialization stage, conducting self verification by designing a self firmware verification method; filling a trusted storage region by reading specific firmware information; at an operation starting stage, conducting the self firmware verification method first, and then conducting trusted authentication on the specific firmware storage region, to achieve the trusted boot of an LC system.

To solve the above technical problem, the present invention also provides a method for trusted booting of PLC based on a measurement mechanism, comprising the following steps:

a step of initializing self firmware verification: on a basis of a trusted root provided by chip hardware, integrally checking firmware information about self storage regions, and storing checking results in a one-to-one corresponding mode;

a step of reading and computing firmware information about a PLC: at the factory initialization stage, loading a flash memory of the PLC onto a hardware carrier, and then reading the firmware information in the flash memory;

a step of checking and storing one by one: at the factory initialization stage, computing the read firmware information for verifying a PLC through an integrity check algorithm, and storing results in a one-to-one corresponding mode, until designated firmware information completes integrity check;

a verification step at the operation start stage: at the operation stage, powering on and starting a device, and invoking the self firmware verification method first to conduct self verification.

For the step of reading the firmware information for verifying the PLC, preferably at the operation stage, a method for reading and computing the firmware information about the PLC is invoked; results are verified with the contents in the trusted storage region in a one-to-one corresponding mode; an operation failure is prompted for an incorrect result; and an operation success is prompted if all results are successfully verified.

The step of checking and storing one by one comprises: completing the integrity check algorithm; the firmware information about the storage region comprises: boot information and MD5 value of an operating original program.

The integrity check method comprises: cooperatively designing software and hardware, grouping the software and concurrently invoking hardware for computation.

The step of checking and storing one by one further comprises: in the process of booting the system, conducting flow design in accordance with the loading process of a boot loader of the system.

The step of checking and storing one by one further comprises: the storage location is a secure and trusted location.

When verification is conducted at the operation start stage, the sequence of booting reading comprises: booting a guidance file BOOT.BIN, a device tree devicetree.dtb, a kernel file uImage and a file system uramdisk.image; the verification method at the operation start stage comprises a check value matching manner.

The integrity check can further comprise:

invoking a hash function in a corresponding file by the system, computing a digest value to check whether the digest value is identical with a previously stored standard value;

if so, indicating that the file is complete, and giving file authorization to execute same;

otherwise, indicating that the file is modified, directly deleting the file, and then continuously verifying the integrity of the next file.

To solve the above technical problem, the present invention also provides an integrity check method used in any of the above method for trusted booting of PLC based on the measurement mechanism. The integrity check method comprises:

invoking a hash function in a corresponding file by the system, computing a digest value to check whether the digest value is identical with a previously stored standard value;

if so, indicating that the file is complete, and giving file authorization to execute same;

otherwise, indicating that the file is modified, directly deleting the file, and then continuously verifying the integrity of the next file.

Beneficial effects generated by the present invention comprise: the method for trusted booting of PLC based on the measurement mechanism in the present invention uses an industrial chip to build a hardware environment, realizes rapid hardware encryption and decryption verification in a cooperative processing manner, uses an integrity algorithm to conduct integrity verification on the boot loader of the PLC system, and ensures the trusted boot of the PLC system.

Beneficial effects generated by the present invention comprise: the method for trusted booting of PLC based on the measurement mechanism in the present invention uses an industrial chip to build a hardware environment, realizes rapid hardware encryption and decryption verification in a cooperative processing manner, uses an integrity algorithm to conduct integrity verification on the boot loader of the PLC system, and ensures the trusted boot of the PLC system.

DETAILED DESCRIPTION OF THE EMBODIMENTS

To make the purpose, the technical solution and the advantages of the present invention more clear and definite, the present invention will be further described below in details with reference to drawings and enumerated embodiments, but the present invention is not limited to the embodiments.

A programmable logic controller (PLC) is a kind of programmable memory used for internally stored programs to execute user-oriented instructions of logic operation, sequence control, timing, counting, arithmetical operation, etc. and to control various machines or production processes through digital or analog input/output.

The PLC is structurally classified into an integral type and a modular type, is classified into a site installation type and a control room installation type according to application environments, and is classified into 1-bit, 4-bit, 8-bit, 16-bit, 32-bit, 64-bit types, etc. according to CPU word length. From an application viewpoint, the type of the PLC is generally selected according to control functions or input/output points.

The I/O points of the integral type PLC are fixed, and thus a selection space for a user is less; the integral type PLC is used for a small control system. The modular type PLC provides many I/O cards or plug-in cards. Therefore, the user can reasonably select and configure I/O points of the control system, and function extension is convenient and flexible. The modular type PLC is generally used for large and medium control systems.

The method for trusted booting of PLC based on the measurement mechanism in the present invention uses an industrial chip to build a hardware environment, realizes rapid hardware encryption and decryption verification in a cooperative processing manner, uses an integrity algorithm to conduct integrity verification on the boot loader of the PLC system, and ensures the trusted boot of the PLC system.

In one embodiment of the present invention, a method for trusted booting of PLC based on a measurement mechanism is provided, comprising the following steps: at a factory initialization stage, conducting self verification by designing a self firmware verification method; filling a trusted storage region (the trusted storage region is a section of invisible region opened for the user in flash to store the check value) by reading specific firmware information; then, at an operation stage, conducting the self firmware verification method first (under the condition that the system is rebooted or under the condition that the system is booted for use by the user, first authenticating the self credibility with a self firmware verification method which corresponds to initialization of the self firmware verification), and then conducting trusted authentication on the specific firmware storage region, to finally achieve the trusted boot of the PLC system.

The self firmware verification method adopts a check value matching manner. Specific firmware information refers to firmware information about industrial control devices, and refers to the firmware information about the PLC in the present embodiment. Because different industrial control devices are not completely identical in the firmware information, specific processing is needed for a boot flow of the self firmware information.

The method mainly comprises the following portions:

initializing self firmware verification: on a basis of a trusted root provided by FPGA chip hardware, integrally checking firmware information about self storage regions (including a guidance file BOOT.BIN, a device tree devicetree.dtb, a kernel file uImage and a file system uramdisk.image); storing checking results for self firmware information about FPGA and computed check value in a one-to-one corresponding mode; and smoothly booting the FPGA if the check is passed;

reading and computing firmware information about a PLC: at the factory initialization stage, loading a flash memory of the PLC onto a hardware carrier of the method, and then mainly reading the firmware information in the flash memory (including the guidance file BOOT.BIN, the device tree devicetree.dtb, the kernel file uImage and the file system uramdisk.image of the PLC, and control application programs);

checking and storing one by one: at the factory initialization stage, computing the read firmware information (i.e., the firmware information in the flash memory) for verifying the PLC by the chip through an integrity check algorithm, and storing check results for the firmware information for verifying the PLC and the firmware information into the trusted storage region in a one-to-one corresponding mode, until designated firmware information completes integrity check;

at the operation start stage: at the operation stage, powering on and starting an FPGA device, and invoking the self firmware verification method first to conduct self verification;

conducting trusted authentication on a specific firmware storage region: reading the firmware information for verifying the PLC; computing the read firmware information for verifying the PLC through the integrity check algorithm; verifying the results with the contents (check results of the PLC) in the trusted storage region in a one-to-one corresponding mode; prompting an operation failure for an incorrect result; and prompting an operation success if all results are successfully verified.

The check method is mainly to complete the integrity check algorithm, and the firmware information about the storage region mainly comprises boot information and MD5 value of an operating original program.

The firmware information for verifying the PLC mainly comprises: booting a guidance file BOOT.BIN, a device tree devicetree.dtb, a kernel file uImage, a file system uramdisk.image and a control application program.

The integrity check method is realized as follows: cooperatively designing software and hardware, grouping the software and concurrently invoking hardware for computation: using two chips for computation. The firmware information for verifying the PLC is divided into two portions respectively outputted to two security encryption chips TPMs in the FPGA, and times of computations of the two chips are controlled according to the size of the firmware information and the maximum computation amount of each TPM. According to the size of the firmware information, for example, under the condition that the chip can compute 16 Byte character block at most, if the firmware information for computation is 256 Byte, then two chips are needed for respectively computing 256/16*2=8 times; and if one chip needs to compute 16 times, software needs to control the grouping. The integrity check method can use one of algorithms such as HASH, SHA and MD5.

One-by-one verification is reflected as follows: in the process of booting the system, flow design is conducted in accordance with the loading process of a boot loader of the system.

The storage location is a secure and trusted location, and is a trusted storage region in the present embodiment.

The sequence of booting reading comprises: booting a guidance file BOOT.BIN, a device tree devicetree.dtb, a kernel file uImage and a file system uramdisk.image.

The verification method can adopt a check value matching manner.

The file BOOT.BIN is composed of fsbl, uboot and a bit stream file.

In another embodiment of the present invention, a method for trusted booting of PLC based on a measurement mechanism is provided, comprising:

At an initialization stage, self firmware verification is first initialized; by using a trusted root functional model provided by chip hardware as a trusted base, firmware boot information about self storage regions is computed and computation results are safely stored.

Preferably, the check method is mainly to complete the integrity check algorithm, and the firmware information about the storage region mainly comprises boot information and MD5 value of an operating original program.

Then, PLC firmware verification is initialized; at the factory initialization stage, a flash memory of the PLC is loaded onto a hardware carrier of the method, and then the firmware information in the flash memory is mainly read, mainly including: the boot guidance file BOOT.BIN, the device tree devicetree.dtb, the kernel file uImage and the file system uramdisk.image.

Trusted chain transmission of the read information is checked and stored one by one; the check value of the integrity check algorithm of the firmware information for verifying the PLC is computed stage by stage; and results are stored in a one-to-one corresponding mode, until designated firmware information completes integrity check.

Preferably, the integrity check method is realized as follows: cooperatively designing software and hardware, grouping the software and concurrently invoking hardware for computation.

Preferably, one-by-one verification is reflected as follows: in the process of booting the system, flow design is conducted in accordance with the loading process of a boot loader of the system.

Preferably, the storage location is a secure and trusted location.

At the operation stage, a device is powered on and started, and the self firmware verification method is invoked first to conduct self verification.

The firmware information for verifying the PLC is read; the sequence for starting the reading is consistent with the sequence of reading the PLC firmware information at the initialization stage; the PLC firmware information is computed; results are verified with the contents in the trusted storage region in a one-to-one corresponding mode; an operation failure is prompted for an incorrect result; and an operation success is prompted if all results are successfully verified.

Trusted chain transmission: a trust relationship is transmitted stage by stage in a manner that measurement is conducted first and then a control is transferred, thereby ensuring safe boot of the PLC system.

Integrity check: the system (an embedded linux4.0.0 system in the present embodiment) invokes a hash function in a corresponding file (a function library of the hash function), and computes a digest value to check whether the digest value is identical with a previously stored standard value, i.e., the check value; if so, it indicates that the file is complete, and file authorization is given to execute; otherwise, it indicates that the file is modified, a potential attack may exist; at this time, a corresponding processing mechanism is to directly delete the file, and then continuously verify the integrity of the next file.

Figure 1:
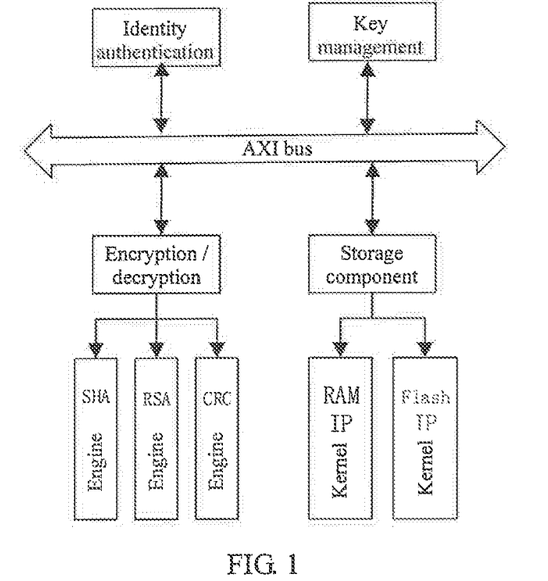
FIG. 1 is a schematic diagram of a Zynq-7030 functional structure of a method for trusted booting of PLC based on a measurement mechanism in embodiments of the present invention.
Figure 2:
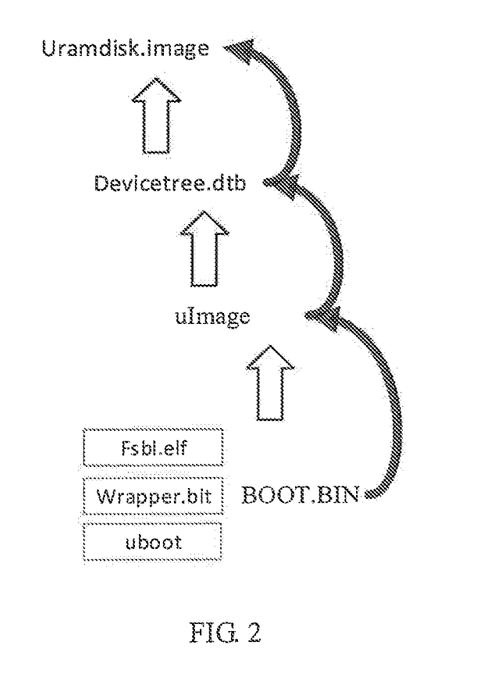
FIG. 2 is a flow chart of checking a system boot loader in a method for trusted booting of PLC based on a measurement mechanism in embodiments of the present invention.
Figure 5:
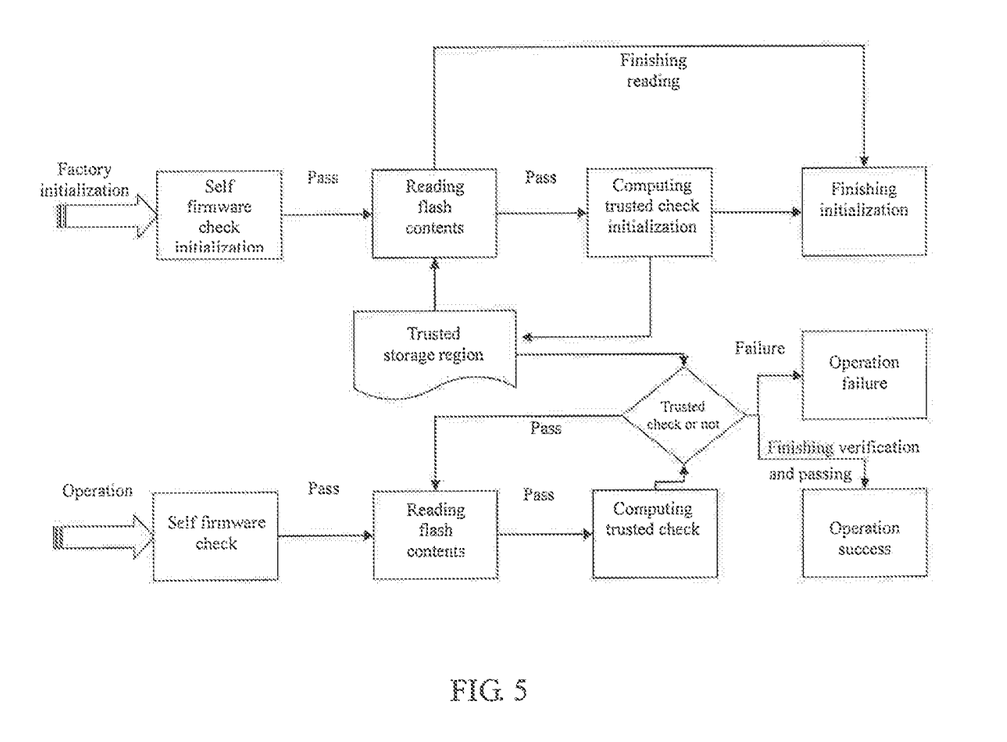
FIG. 5 is a flow chart of a method for trusted booting of PLC based on a measurement mechanism in embodiments of the present invention.

In another embodiment of the present invention, FIG. 1 is a schematic diagram of a Zynq-7030 functional structure of a method for trusted booting of PLC based on a measurement mechanism in embodiments of the present invention. The PLC in the present embodiment uses a Zynq-7030 chip as a high-end main controller core chip. Therefore, a picozed 7030 development board is used to make a hardware platform for functional verification operation of the patent. FIG. 2 is a flow chart of checking a system boot loader in a method for trusted booting of PLC basedIn specific implementation of the method of the present invention, a main working flow is as follows. With reference to the overall flow chart of FIG. 5, a method for trusted booting of the picozed 7030 development board is introduced:

Step 1: providing security check and algorithm chips and other hardware modules, drives, interfaces, etc. at the time of starting an embedded operating system on the basis of a system on chip (SoC), wherein in the embodiment of the patent, an SDC32A12 security chip is used, a common embedded linux-2.6.34 version is used and a security chip drive is encapsulated through a national security standard SKF.

Step 2: at an initialization stage, first initializing self firmware verification; by using a trusted root functional model provided by security chip hardware as a trusted base, computing firmware boot information about self storage regions; and by referring to firmware names provided in FIG. 2, storing computation results into the security chip in the present embodiment, wherein fsbl is a first stage boot loader, wrapper.Bit is a hardware configuration bit stream file (wrapper has no special meaning), and uboot is Universal Boot Loader which is a system guidance.

Figure 3:
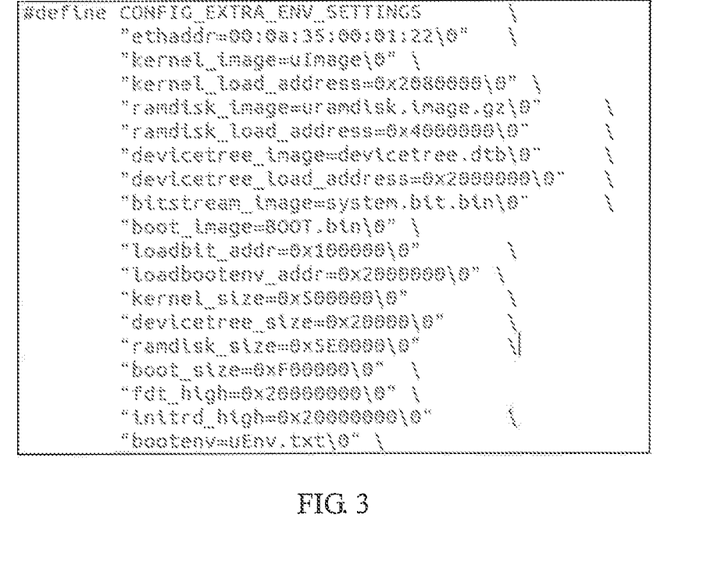
FIG. 3 is a configuration diagram of a boot environment in embodiments of the present invention.

Step 3: when starting the PLC, starting environment configuration, as in FIG. 3 which shows a picozed7030 boot environment configuration; and after powering on the system, first initializing the boot of the hardware environment for the system, wherein load addresses of all files are configured in the system boot environment, and the files required for booting the PLC embedded operating system include the boot guidance file BOOT.BIN, the device tree devicetree.dtb, the kernel file uImage and the file system uramdisk.image;

checking and storing trusted chain transmission of the read information one by one; computing the integrity check value of the read firmware information for verifying the PLC stage by stage; and storing results in a one-to-one corresponding mode, wherein storage contents include boot information and the MD5 value of an operating original program until designated firmware information completes integrity check.

Figure 4:
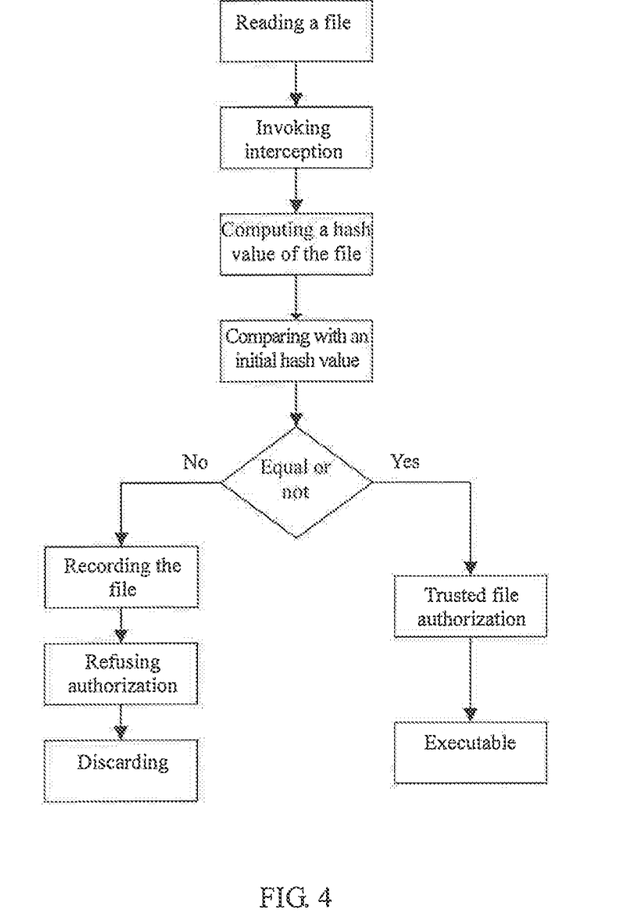
FIG. 4 is a schematic diagram of file integrity verification based on a hash algorithm in embodiments of the present invention.

Step 4: at the operation stage, powering on and starting a device, and invoking the self firmware verification method first to conduct self verification, wherein the firmware information for verifying the PLC is read; the sequence for starting the reading is consistent with the sequence of reading the PLC firmware information at the initialization stage; hash code segments in all the files are invoked in a predetermined execution sequence to conduct integrity check; the PLC firmware information is computed; results are verified with the contents in the trusted storage region in a one-to-one corresponding mode; the system shown in FIG. 4 invokes a hash function in a corresponding file, and computes a digest value to check whether the digest value is identical with a previously stored standard value; if so, it indicates that the file is complete, and file authorization is given to execute; otherwise, it indicates that the file is modified, a potential attack may exist; at this time, a corresponding processing mechanism is to directly delete the file, and then continuously verify the integrity of the next file.

A trust relationship is transmitted stage by stage in a manner that measurement is conducted first and then a control is transferred; an operation failure is prompted for an incorrect result; and an operation success is prompted if all results are successfully verified.

After integrity verification of all the files is completed, if a file is modified, system cannot be booted due to the lack of a necessary file for the boot, needs to wait for an administrator to reload the file for conducting a new round of check, and will be booted until check is successful.

The above-mentioned embodiments are only several embodiments of the present invention, and are not intended to limit the present invention in any form. Although the present invention discloses the above-mentioned embodiments through preferred embodiments, the above-mentioned embodiments are not intended to limit the present application. For those skilled in the art, various modifications and alterations made using the above disclosed technical content without departing from the spirit of the technical solution of the present application are all equivalent to the implementation cases, and all belong to the scope of the technical solution.

We claim:

1. A method for trusted booting of a programmable logic controller (PLC), comprising:
at a factory initialization stage:
initializing a self-firmware verification, comprising integrally checking firmware information on a basis of a trusted root provided by a field-programmable gate array (FPGA) chip hardware;
reading firmware information, comprising loading a flash memory of the PLC onto a hardware carrier, and then reading firmware information in the flash memory;
conducting an integrity check, comprising computing the read firmware information in the flash memory for verifying the PLC through an integrity check algorithm by dividing the read firmware information into at least two portions and outputting a first portion of the divided firmware information to a first security encryption chip of the FPGA chip hardware and outputting a second portion of the divided firmware information to a second security encryption chip of the FPGA chip hardware; and
storing verification results of the integrity check in a one-to-one corresponding mode in a trusted region; and
at an operation starting stage:
invoking self-firmware verification, comprising integrally checking firmware information on a basis of the trusted root provided by the FPGA chip hardware;
reading firmware information, comprising loading the flash memory of the PLC onto the hardware carrier, and then reading firmware information in the flash memory;
conducting an integrity check, comprising computing the read firmware information in the flash memory for verifying the PLC through an integrity check algorithm by dividing the read firmware information into at least two portions and outputting a first portion of the divided firmware information to the first security encryption chip of the FPGA chip hardware and outputting a second portion of the divided firmware information to the second security encryption chip of the FPGA chip hardware; and
conducting trusted authentication, comprising: comparing verification results of the integrity check at the operation starting stage to the verification results stored in the trusted region at the factory initialization stage.

2. The method according to claim 1, wherein
the trusted authentication at the operation stage comprises comparing verification results from the operation stage with contents in the trusted region in a one-to-one corresponding mode; and prompting an operation failure for an incorrect result, and prompting an operation success if all results are successfully verified.

3. The method according to claim 1, wherein
self-firmware verification comprises integrally checking firmware information about a storage region, the firmware information about the storage region comprising: boot information and MD5 value of an operating original program.

4. The method according to claim 1, wherein the integrity check algorithm comprises: cooperatively designing software and hardware, grouping the software and concurrently invoking hardware for computation.

5. The method according to claim 1, wherein the integrity check further comprises: in the process of booting the system, conducting flow design in accordance with a loading process of a boot loader of the system.

6. The method according to claim 1, wherein the trusted region is a secure and trusted location.

7. The method according to claim 1, wherein self-firmware verification at the operation start stage comprises: booting a guidance file BOOT.BIN, a device tree device-tree.dtb, a kernel file uImage, and a file system uramdisk.image; and performing verification in a check value matching manner.

8. The method according to claim 1, wherein the integrity check algorithm comprises:
invoking a hash function in a corresponding file by the system, and computing a digest value to check whether the digest value is identical with a previously stored standard value;
wherein, if the values are identical, indicating that the file is complete, and giving file authorization to execute same; and, if the values are not identical, indicating that the file is modified, and deleting the file.

9. The method according to claim 1, wherein
the first and second security encryption chips of the FPGA hardware are two separate trusted platform modules (TPMs).

* * * * *